(No Model.)
J. M. SCHORB, Jr.
CAP FOR CARRIAGE AXLES.
No. 302,038. Patented July 15, 1884.
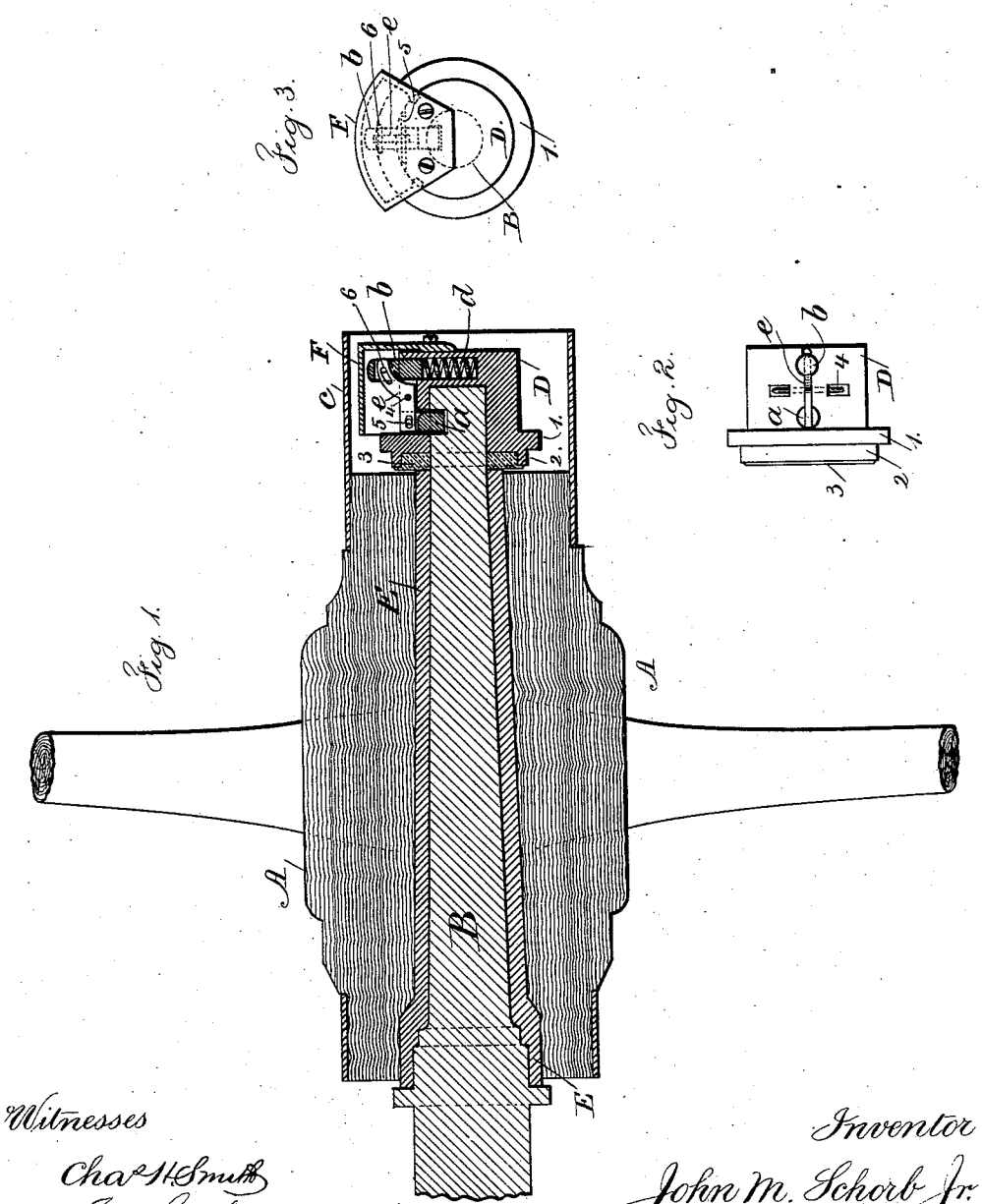
Witnesses
Chas H Smith
J Stait
Inventor
John M. Schorb Jr.
per Lemuel W. Serrell
Atty

UNITED STATES PATENT OFFICE.

JOHN M. SCHORB, JR., OF PLAINFIELD, NEW JERSEY, ASSIGNOR TO CARRIE L. SCHORB, OF SAME PLACE.

CAP FOR CARRIAGE-AXLES.

SPECIFICATION forming part of Letters Patent No. 302,038, dated July 15, 1884.

Application filed November 19, 1883. (No model.)

*To all whom it may concern:*

Be it known that I, JOHN M. SCHORB, Jr., of Plainfield, in the county of Union and State of New Jersey, have invented a new and useful Improvement in Caps for Carriage-Axles; and the following is declared to be a description of the same.

The wheels of carriages and similar vehicles are generally secured upon their axles by nuts screwed upon the outer end of said axles and clamped against a shoulder formed on the axle. Caps for securing carriage-wheels upon their axles have been heretofore employed, and said caps have been secured in place in various ways.

My invention relates to an improvement in caps for securing carriage and other wheels upon their axles; and said invention consists in a cap constructed with a spring push-pin and lever operating a locking-pin, said locking-pin passing through the cap and into a hole in the axle. The center of the cap is open to pass upon the end of the axle, and I provide a dust-cap over the parts, to prevent them becoming clogged with dirt, and also a washer between the cap and the end of the hub.

In the drawings, Figure 1 is a longitudinal section of a wheel-hub and axle and the securing-cap. Fig. 2 is a plan of the cap separate, and Fig. 3 is an end view of the cap separate.

The wheel and hub A and axle B may be of any desired shape or construction, it being understood that it is preferable for the hub to be provided with a metal ring, c, (as is usually the case,) for the protection of the cap from injury and accident. The cap D is of circular shape, and provided with strengthening ribs or flanges 1 2 and a central opening for the reception of the axle B, and a recess at the back for the washer 3, against which the end of the axle-box E takes a bearing. The cap D is slotted and perforated with two holes for the reception of the pins *a b* and pivoted lever *e*. The locking-pin *a* passes through a hole in the cap D, its upper surface being flush with the cap and slotted for the pivoted lever *e*, while its lower end extends into the central opening in the cap, and when in place said pin enters a hole in the end of the axle, as shown in Fig. 1. The spring push-pin *b* is in a hole in the forward end of the cap, and underneath said push-pin is a spiral spring, *d*, which keeps said pin in an elevated position. The lever *e* is preferably made of the shape shown in Fig. 1, and pivoted to the cap by the pin 4, the ends of said lever entering slots in the pins *a b*, and being itself slotted, as shown, for the pins 5 6, passing through the locking-pin *a* and spring push-pin *b*, respectively, and connecting these parts together. These slots in the lever allow for its change of position and rocking motion of the lever in operating the pins.

To secure the cap D upon the axle, the cap is grasped in the hand, the thumb depressing the spring push-pin *b* by pressing on its exposed end, and, through the lever *e*, raising the locking-pin *a*. The parts are so held while the cap is being placed on the end of the axle B and the parts brought into position, so that the locking-pin *a* will enter the hole in the axle. The thumb is then removed, and the expansion of the compressed spiral spring *d* to its normal position raises the push-pin *b*, and, through the lever *e*, presses the locking-pin *a* into the hole in the axle and holds it securely in place.

A dust-cap, F, may be employed to protect the moving parts not only from dust, but from injury, and it is preferable to secure said cap by dovetail grooves upon the surface of the cap and screws into the ends of the dust-cap.

I claim as my invention—

1. The combination, with the wheel and axle of a vehicle, of a cap, D, having a locking-pin, *a*, for securing the cap upon the axle, and a lever, *e*, and push-pin *b*, for operating the same, substantially as set forth.

2. In a cap for carriage-axles, the combination of the locking-pin *a*, lever *e*, pivoted to the cap, push-pin *b*, and spiral spring *d*, substantially as set forth.

3. In a cap for carriage-axles, the combination of the locking-pin *a*, lever *e*, push-pin *b*, spiral spring *d*, and a dust-cap, F, secured upon the cap D, and covering the operating parts to protect them from dust and injury, substantially as set forth.

Signed by me this 14th day of November, A. D. 1883.

JNO. M. SCHORB, JR.

Witnesses:
WILLIAM LITTLE,
GEO. C. GODOWN.